Figure 1:
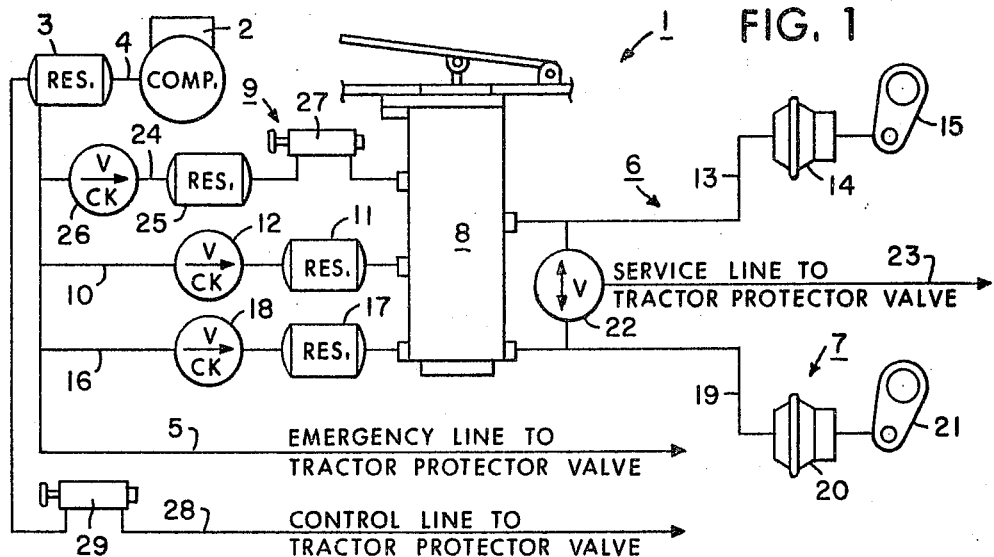

Oct. 18, 1966    R. C. BUELER    3,279,867
CONTROL VALVE

Filed March 1, 1965    3 Sheets-Sheet 1

INVENTOR
RICHARD C. BUELER
BY
Joseph E. Papin

INVENTOR
RICHARD C. BUELER

Oct. 18, 1966 — R. C. BUELER — 3,279,867
CONTROL VALVE

Filed March 1, 1965 — 3 Sheets-Sheet 3

INVENTOR
RICHARD C. BUELER
BY
Joseph E. Papin

United States Patent Office 3,279,867
Patented Oct. 18, 1966

3,279,867
CONTROL VALVE
Richard C. Bueler, Glendale, Mo., assignor to Wagner Electric Corporation, St. Louis, Mo., a corporation of Delaware
Filed Mar. 1, 1965, Ser. No. 435,823
6 Claims. (Cl. 303—52)

This invention relates to fluid pressure systems and in particular to emergency actuating means therefor.

In the past, various types of manually actuated application or control valves were utilized to effect the energization of fluid pressure systems, such as those utilized on tractor vehicle or tractor-trailer vehicle combinations; however, an undesirable or disadvantageous feature of such past manually actuated application valves and systems was manifested in the inability of the vehicle operator to actuate said application valves and systems in the event the operator treadle or treadle linkage for application valves was lost, disengaged, broken, or for some other reason became inoperable to effect the actuation of said application valves and energize said systems.

The object of the present invention is to provide a novel control valve means for use in a fluid pressure system which overcomes the aforementioned undesirable or disadvantageous feature and others, and this and other objects and advantages of the present invention will become apparent hereinafter.

Briefly, the invention embodies a control valve having manually operable means therein for driving application means to control pressure fluid flow through said control valve and emergency chamber means between said manually operable means and application means for selective subjection to the atmosphere or to a fluid pressure, said manually operable means and application means being concertly movable when said chamber is subjected to the atmosphere to establish pressure fluid flow through said control valve and said application means being independently movable in response to fluid pressure in said chamber to also establish pressure fluid flow through said control valve in the event said manually operable means is inoperable.

Figure 3:
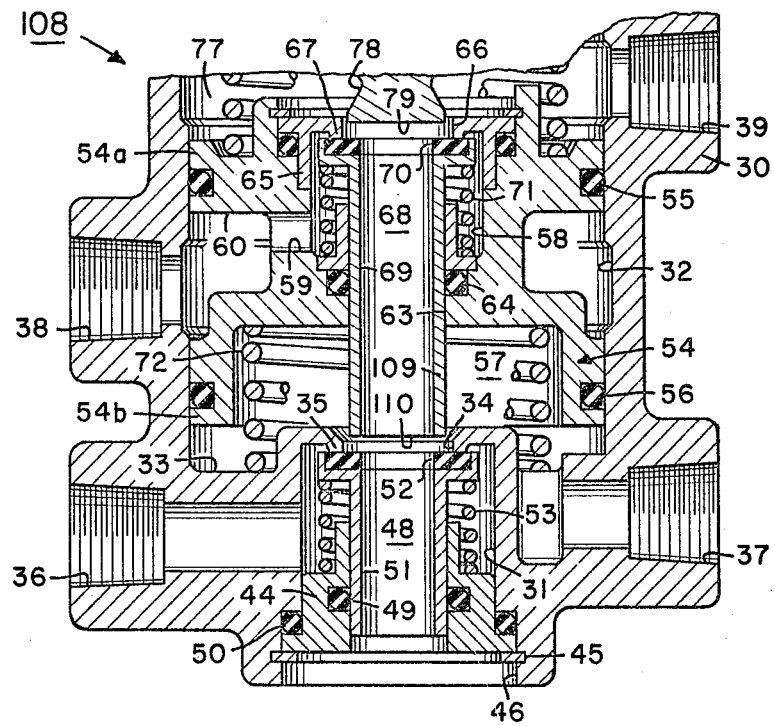
Figure 2:
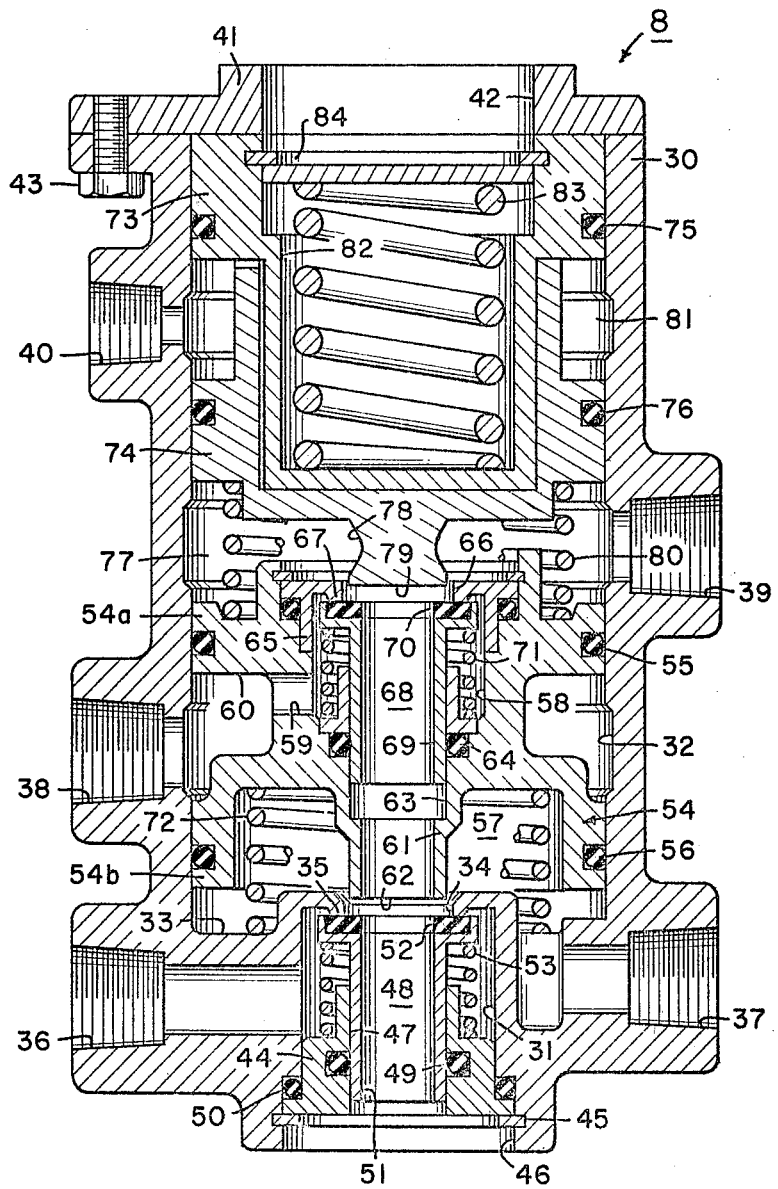
Figure 4:
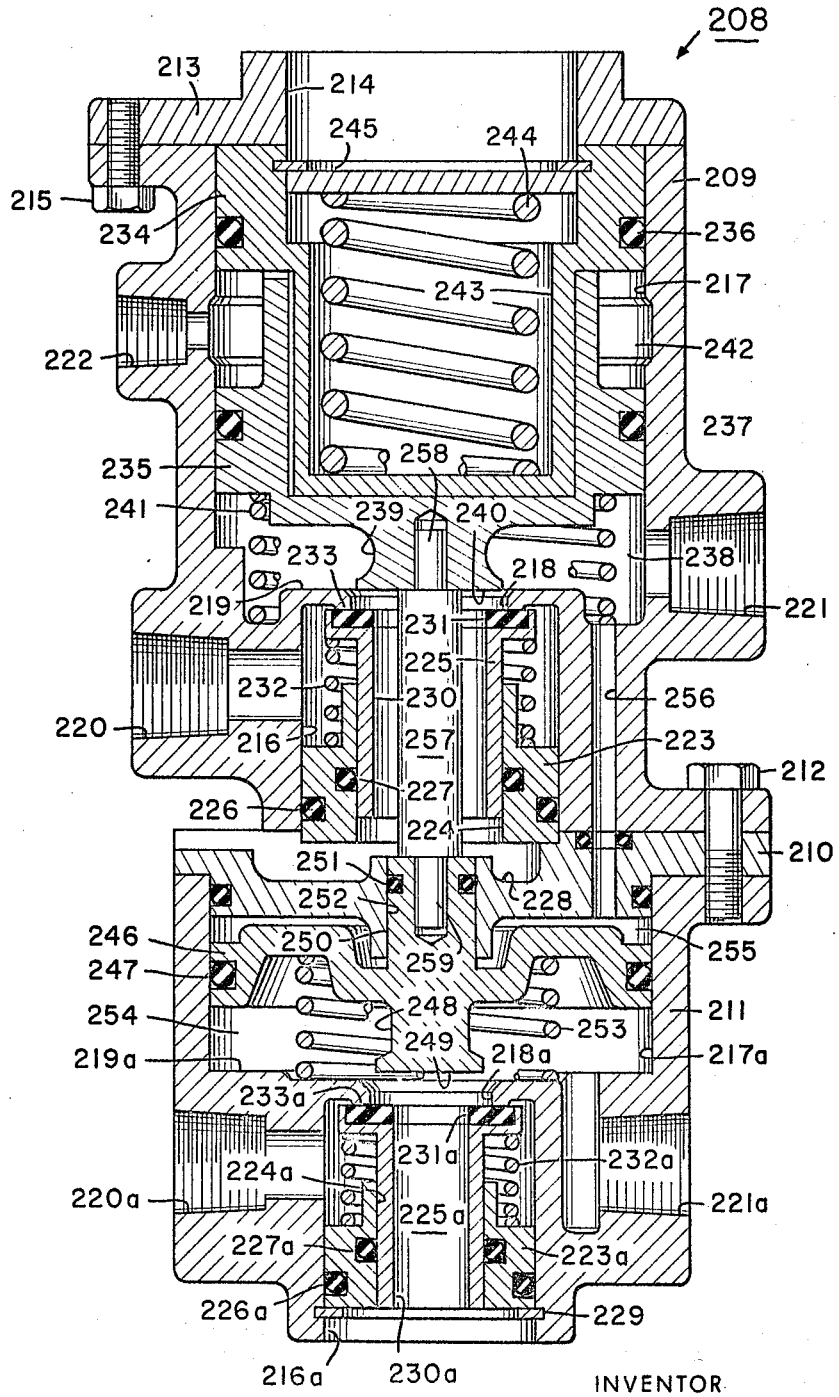

In the drawings which illustrate embodiments of the invention,

FIG. 1 is a diagrammatic view of a fluid pressure system having control valve means therein embodying the present invention, FIG. 2 is a greatly enlarged cross-sectional view of the control valve of FIG. 1 embodying the present invention, FIG. 3 is a fragmentary view of the control valve of FIG. 2 illustrating another embodiment thereof in cross-section, and FIG. 4 is a sectional view of another control valve embodying the present invention for use in the system of FIG. 1.

Referring now to the drawings and in particular to FIG. 1 thereof, a dual or separate fluid pressure system 1, such as that utilized on the tractor of a tractor-trailer vehicle combination, is shown having fluid pressure generating means, such as a compressor 2, connected with a system or main reservoir 3 by a conduit 4, and an emergency line 5 is connected between said main reservoir and the emergency port of a tractor protector valve (not shown) of the type well known to the art, such as that disclosed in United States Patent No. 2,859,763, issued November 11, 1959, to Cyril B. Fites, said emergency line being adapted for operative connection through said tractor protector valve with the emergency portion of the usual trailer braking system, also well known to the art, as illustrated in the aforementioned patent. The system 1 is also provided with separate fluid pressure application branches, indicated generally at 6, 7 for connection through a treadle operated, tandem control or application valve 8 with separate axle sets of wheel brake assemblies (not shown), and a fluid pressure control branch, indicated generally at 9, is also provided for connection with said control valve.

The application branch 6 includes a conduit 10 connected in parallel circuit relation between the emergency line 5 and one of a pair of separate inlet ports of the control valve 8 having an application or protected reservoir 11 interposed therein, and a uni-directional check valve 12 is connected in the conduit 10 to provide for uni-directional pressure fluid flow only from the main reservoir 3 to said protected reservoir 11. The control valve 8 is also provided with a pair of separate outlet ports, and a tractor service line or conduit 13 connects one of said outlet ports with a fluid pressure responsive motor or brake chamber 14 which is operatively connected with linkage means, such as a slack adjustor 15, to control the energization of a friction device or wheel brake assembly on one tractor axle (not shown).

The application branch 7 includes a conduit 16 connected in parallel circuit relation between the emergency line 5 and the other inlet port of the control valve 8 having another application or protected reservoir 17 interposed therein, and a uni-directional check valve 18 is connected in the conduit 16 to provide for uni-directional pressure fluid flow only from the main reservoir 3 to said protected reservoir 17. Another tractor service line or conduit 19 is connected between the other of the outlet ports of the control valve 8 and another fluid pressure responsive motor or brake chamber 20 which is operatively connected with linkage means, such as a slack adjustor 21, to control the energization of another friction device or wheel brake assembly on another tractor axle (not shown). A two-way valve 22 is connected between the tractor service lines 13, 19 to provide pressure fluid flow from either thereof to another conduit or service line 23 which is connected with the service port of the aforementioned tractor protector valve, said service line 23 being adapted for operative connection through said tractor protector valve with the service portion of the aforementioned, usual, trailer braking system.

The control branch 9 includes a conduit 24 connected in parallel circuit relation between the emergency line 5 and the control port of the control valve 8 having a control or protected reservoir 25 interposed therein, and a uni-directional check valve 26 is connected in the conduit 24 to provide for uni-directional pressure fluid flow only from the main reservoir 3 to said protected reservoir 25. A push-pull valve 27 of a type well known to the art is interposed in the conduit 24 between the reservoir 25 and the control port of the control valve 8, said push-pull valve being manually operable between a charging position for connecting said control port in pressure fluid communication with the control reservoir 25 and a venting position interrupting pressure fluid communication between said control port and said control reservoir and venting said control port to the atmosphere.

To complete the description of the system 1, another conduit 28 is connected between the main reservoir 3 and the control port or portion of the aforementioned tractor protector valve having another push-pull type hand valve 29 interposed therein, said push-pull valve 29 being similar to the push-pull valve 27 and also being manually operable between a charging position connecting the main reservoir 3 in pressure fluid communication with the control portion of said tractor protector valve to thereby effect open pressure fluid communication between the emergency and service lines 5, 23 of the tractor and those of the aforementioned, usual, trailer braking system and a venting position for venting the control portion of the tractor protector valve to the atmosphere thereby interrupting the pressure fluid communication between the emergency and service lines 5, 23 of the tractor and those of the trailer braking systems.

Referring now to FIG. 2, the control valve 8 is provided with a housing 30 having an axial bore 31 and a counterbore 32 therein, said bore forming an inlet chamber. A radially extending wall 33 is provided on the housing 30 between the bore and counterbore 31, 32, and a connecting passage 34 extends through said wall between said bore and counterbore, said wall having a valve seat 35 thereon in circumscribing relation with said connecting passage. Inlet and outlet ports 36, 37 which receive conduits 16, 19, as previously mentioned, are provided in the housing 30 connecting with the bore and counterbore 31, 32 adjacent to the housing wall 33, respectively. Other inlet and outlet ports 38, 39 which receive the conduits 10, 13, as previously mentioned, are provided in the housing 30, said outlet port 39 connecting with the housing counterbore 32 near the midportion thereof and said inlet port 38 connecting with said housing counterbore between the housing wall 33 and said outlet port 39, and an emergency or control port 40 which receives the conduit 24, as previously mentioned, is also provided in said housing connecting with said housing counterbore between the upper or open end thereof and said outlet port 39. As will become apparent hereinafter, inlet and outlet ports 36, 37 form one separate set of ports, and inlet and outlet ports 38, 39 form another separate set of ports. A closure member 41 is provided at the open end of the counterbore 32 having a guide opening 42 therethrough to receive the force transmitting linkage of an operator control lever (not shown), and said closure member is fixedly connected with the housing 30 by suitable means, such as studs 43.

A valve guide member 44 is positioned in the housing bore 31 against displacement by a snap ring and groove assembly 45 provided adjacent to the lower end of said bore, said lower end of said bore defining an exhaust port 46. The valve guide member 44 is provided with an axial valve bore 47 in which a valve element 48 is slidably received, and seals 49, 50 are carried in said valve guide member in sealing engagement with said valve element and the housing bore 31, respectively. The valve element 48 is provided with an axial opening or passage 51 therethrough, and an annular resilient seal or disc 52 is provided on the upper end of said valve element in circumscribing relation with said exhaust opening. A valve spring 53 biased between the valve element 48 and the valve guide member 44 normally urges the valve seal 52 into sealing engagement with the valve seat 35 on the housing wall 33.

A piston or valve control member, indicated generally at 54, is slidable in the housing counterbore 32, and seals 55, 56 are carried in said piston adjacent to the upper and lower ends 54a, 54b thereof in sealing engagement with said housing counterbore. An outlet or reaction chamber 57 is formed in the housing counterbore 32 between the housing wall 33 and the piston lower end 54b in open pressure fluid communication with the outlet port 37, and said outlet chamber is normally exhausted to the atmosphere through the valve element exhaust opening 51 and exhaust port 46. The piston 54 is provided with a centrally located inlet chamber or bore 58 which is connected by passage 59 to a peripheral groove 60 provided in said piston between the seals 55, 56, said peripheral groove being in open pressure fluid communication with the inlet port 38 at all times. An extension 61 is provided on the piston lower end 54b having a valve seat 62 on the free end thereof for operative engagement with the inlet valve 48, and an axial valve receiving or guide bore 63 having a seal 64 disposed therein extends through said extension between said valve seat and the lower end of the valve chamber 58. A wall or sealing member 65 is fixedly positioned in the upper end of the piston valve chamber 58 against displacement therefrom, and a connecting passage 66 is axially provided through said wall member having a valve seat 67 in circumscribing relation therewith. Another inlet valve element 68 is slidably received in the valve guide bore 63 in sealing engagement with the seal 64, and an axial exhaust opening or passage 69 is provided through said valve element in open pressure fluid communication with said piston guide bore 63. Another resilient seal or disc 70 is provided on the upper end of the valve element 68 in circumscribing relation with the exhaust passage 69 and is normally urged into sealing engagement with the wall member valve seat 67 by a valve spring 71 interposed in the piston 54. A return spring 72 is interposed between the housing wall 33 and the piston lower end 54b to normally maintain the valve seat 62 in spaced relation with the valve element 48.

A force applying piston 73 and a control piston 74 having peripheral seals 75, 76 therein, respectively, are slidably received in the housing counterbore 32 providing a pair of concertly and relatively movable application members, as discussed in detail hereinafter. The control piston 74 is slidable in the housing counterbore 32 between the outlet and control ports 39, 40, and an outlet chamber 77 is defined between said control piston and the upper end 54a of the piston 54 in open pressure fluid communication with the outlet port 39. An extension 78 is integrally provided on the control piston having a valve seat 79 on the free end thereof for operative engagement with the valve element 68, and a return spring 80 is interposed between the pistons 54, 74 to normally maintain said valve seat 79 in predetermined spaced relation with said valve element 68.

The force applying piston 73 is slidable in the housing counterbore 32 between the closure member 41 and the control port 40, and a control chamber 81 is defined in said housing counterbore between pistons 73, 74 in open pressure fluid communication with said control port. It should be noted that the return spring 80 normally urges the control piston 74 into abutment with the force applying piston 73 for concert applied force movement therewith and also urges said force applying piston toward displacement preventing engagement with the closure member 41. A metering spring bore 82 is provided in the force applying piston 73, and a pre-compressed metering spring assembly 83 is movably contained within said metering spring bore between the lower end wall thereof and a snap ring and groove assembly 84 provided in said metering spring bore adjacent the upper end thereof, said metering spring 83 being aligned with the closure member opening 42 to receive the force transmitting linkage of the operator control treadle (not shown).

Under normal operating conditions with the push-pull valve 27 in the venting position thereof and the push-pull valve 29 in the charging position thereof, fluid pressure generated by the compressor 2 flows through the conduit 4 to the main reservoir 3 and therefrom through the emergency and control lines 5, 28 to the emergency and control portions of the tractor protector valve, respectively. Fluid pressure also flows from the emergency line 5 through conduits 10, 16, 24 and the uni-directional flow valves 12, 18, 26 therein into the protected reservoirs 11, 17, 25 of the application and control branches 6, 7, 9, respectively. From the foregoing, it is apparent that the application and control branch reservoirs 11, 17, 25 are protected reservoirs since the unidirectional valves 12, 18, 26 respectively, protect said reservoirs 11, 17, 25 against loss of fluid pressure due to a malfunctioning compressor and/or leaks in the system 1 ahead of said reservoirs. With the fluid pressure so established in the main reservoir 3 and the application and control branch reservoirs 11, 17, 25, the component parts of the control valve 8 are positioned as shown in FIG. 2.

If the operator desires to effect a braking application under normal operating conditions, a manually applied force on the metering spring and retainer assembly 83 concertedly moves the force applying and control pistons 73, 74 and the relay piston 54 downwardly against the compressive forces of springs 72, 80 to engage the valve seats 62, 79 with the valve elements 48, 68 closing the exhaust openings 51, 69 therein and isolating the outlet chambers 57, 77 from the atmosphere. Further concert downward movement of the pistons 73, 74, 54 effects substantially simultaneous disengagement of the valve elements 48, 68 from their seats 35, 67 to establish pressure fluid communication between the inlet and outlet ports 36, 37 and 38, 39, respectively. The pressure fluid flows in the application branch 7 from the protected reservoir 17 through the conduit 16, the inlet port 36, the inlet chamber 31, the connecting passage 34, the outlet chamber 57 and the outlet port 37 into the conduit 19 to actuate the brake chamber 20 which, in turn, rotates the slack adjustor 21 to energize the wheel brake assembly associated therewith. Pressure fluid also flows in the application branch 6 from the protected reservoir 11 through the conduit 10, the inlet port 38, the inlet chamber 58, 59, 60 of the piston 54, the piston connecting passage 66, the outlet chamber 77 and the outlet port 39 into the conduit 13 to actuate the brake chamber 14, which, in turn, rotates the slack adjustor 15 to energize the wheel brake assembly associated therewith. Of course, the two-way valve 22 functions in response to applied fluid pressure in either of the service lines 13, 19 to provide passage thereof through the conduit 23 to the service portion of the tractor protector valve to effect service energization of the trailer braking system in the usual manner. It should be noted that the magnitudes of the fluid pressures so metered by the valve elements 48, 68 through the system branches 6, 7 are substantially equal, and since said valve elements are substantially balanced in their open positions and the opposed ends 54a, 54b of the relay piston 54 are substantially equal, the reaction forces of the substantially equal fluid pressures in the outlet chambers 57, 77 acting on said relay piston opposed ends are self-cancelling.

When the reaction force of the established fluid pressure in the outlet chamber 77 acting on the effective area of the control piston 74 equals the applied force on the force applying piston 73, said pistons are concertedly moved upwardly against the metering spring 83, and the compressive force of the spring 72 effects concerted upward movement of the relay piston 54 therewith. This concerted upward movement of the pistons 54, 73, 74 positions the valve elements 48, 68 in lapped engagement with their seats 35, 67 and positions the seats 62, 79 on said pistons 54, 74 in lapped engagement with said valve elements 48, 68, respectively. The reaction force acting through the pistons 73, 74 on the metering spring 83 against the applied force is substantially equal and opposite thereto and affords the operator an accurate and direct "feel" as to the extent of the braking effort or application. If a greater braking effort is desired, the manually applied force is increased, and the component parts of the control valve 8 function in the same manner as previously described to again move said component parts to their lapped positions.

When the desired braking effort is attained, the manually applied force is removed, and return springs 72, 80 move the pistons 54, 73, 74 upwardly toward their original positions which disengages the valve seats 62, 79 from the valve elements 48, 68 opening the exhaust passages 51, 69 thereof to re-establish pressure fluid communication between the outlet chambers 57, 77. In this manner, the wheel brake assembly associated with the brake chamber 20 is de-energized by exhausting fluid pressure from said brake chamber through the conduit 19, the outlet port 37, the outlet chamber 57, the connecting passage 34, and the exhaust opening 51 of the valve element 48 to the exhaust port 46. At the same time, the wheel brake assembly associated with the brake chamber 14 is also de-energized by exhausting fluid pressure from said brake chamber through the conduit 13, the outlet port 39, the outlet chamber 77, the connecting passage 66, the exhaust passage 69 of the valve element 68, and the valve bore 63 of the relay piston 54 into the outlet chamber 57 and therefrom to the exhaust port 46, as previously described. Of course, the two-way valve 22 functions to provide simultaneous exhaustion of the service line 23 to either of the conduits 13, 19 thereby also effecting exhaustion of the service portion of the trailer braking system in the usual manner.

In the event fluid pressure is reduced or lost in one of the reservoirs 11, 17 of the appliction branches 6, 7 to create an emergency condition, the control valve 8 functions in substantially the same manner to effect pressure fluid flow through the application branch having the charged reservoir therein. In the event fluid pressure is lost from the application branch 7, the lower end 54b of the relay piston 54 is moved into abutment with the housing wall 33 in response to the applied force movement of pistons 73, 74 to establish pressure fluid flow through the application branch 6, as previously described; and, likewise, in the event fluid pressure is lost from the application branch 6, the applied force movement of pistons 73, 74 engages piston 73 in abutment with the relay piston 54, said pistons being thereafter movable to effect the application of fluid pressure through the application branch 7, as previously described. It should also be noted that depletion of the fluid pressure in one of the application branch reservoirs 11, 17 also effects depletion of the fluid pressure from the main reservoir 3, but the control reservoir 25 of the control branch 9 is protected against depletion by the check valve 26.

In the event the operator treadle or treadle linkage is lost, broken, disengaged from the control valve 8, or for some other reason becomes inoperative to prevent the transmission of the operator applied force to the force applying piston 73 to actuate the system 1, the operator can manually move the push-pull valve 27 to the emergency or charging position thereof to interrupt pressure fluid communication between the control chamber 81 of the control valve 8 and the atmosphere and establish pressure fluid communication between the protected control branch reservoir 25 and the control chamber 81 through the conduit 24. When the control branch 9 of the system 1 is manually actuated in this manner, the fluid pressure in the control chamber 81 acts on the effective area of the force applying piston 73 to urge it against the closure member 41, and the fluid pressure in said control chamber also acts on the effective area of the control piston 74 therein to move said control piston downwardly relative to said force applying piston. This relative movement of the control piston 74 effects concerted downward movement of the relay piston 54 therewith to actuate the valve elements 48, 68 and establish pressure fluid flow through the application branches 6, 7 to energize the wheel brake assemblies thereof, as previously described.

Referring now to FIG. 3, another control valve 108 is shown having substantially the same component parts and functioning in the system 1 in substantially the same manner as the control valve 8 with the following exceptions. The valve element 68 of the control valve 108 is provided with an extension 109 through which the valve element exhaust passage 69 extends to define a valve seat 110 on the lower end of said valve extension for operative engagement with the valve element 48.

In the operation of the control valve 108 in the system 1, the downward movement of the control piston 74 is initially accompanied by the relay piston 54 until the control piston valve seat 79 engages the valve element 68, and the extension valve seat 110 of the valve element 68 engages the valve element 48, and thereafter the control piston 74 is movable relative to the relay piston 54 to effect simutaneous disengagement of said valve elements 48, 68 from their seats 35, 67 to establish simultaneous pressure fluid flow through the application branches 6, 7, as previously described.

Referring now to FIG. 4, another control valve 208 is shown for connection and operation in the system 1 in substantially the same manner as the previously described control valves 8, 108, with the following exceptions. The control valve 208 is provided with upper, intermediate and lower housings 209, 210, 211 interconnected against displacement by suitable means, such as studs 212, and a closure member 213 having a bore 214 therethrough is connected with the upper end of said upper housing by suitable means, such as studs 215.

The upper and lower housings 209, 211 are provided with bores 216, 216a forming inlet chambers and counterbores 217, 217a, and connecting ports 218, 218a are provided through housing walls 219, 219a between said bores and counterbores. Inlet and outlet ports 220, 220a and 221, 221a which receive conduits 11, 16 and 13, 19 are provided in the upper and lower housings 209, 211 adjacent opposite sides of the housing walls 219, 219a connecting with the bores and counterbores 216, 216a and 217, 217a, respectively, and a control port 222 which receives the conduit 24 is also provided in said upper housing connecting with said counterbore 217 between the upper end thereof and said outlet port 221. Valve guide members 223, 223a having valve bores 224, 224a therethrough with valve elements 225, 225a reciprocal therein are positioned in the upper and lower housing bores 216, 216a against displacement therefrom, and seals 226, 226a and 227, 227a are carried in said valve guide members in sealing engagement with said upper and lower housing bores and said valve elements. The valve guide 223 is positioned in abutment with a recess 228 in the intermediate housing which forms an exhaust port for the valve element 225, and a snap ring and groove assembly 229 is provided adjacent the lower end of the bore 216a in displacement preventing engagement with the valve guide member 223a. Valve elements 225, 225a are provided with exhaust openings 230, 230a therethrough and annular sealing discs 231, 231a on the upper end thereof in circumscribing relation with said exhaust openings, respectively. Valve springs 232, 232a are biased between valve guide members 223, 223a and valve elements 225, 225a normally urging said valve seals 231, 231a into sealing engagement with valve seats 233, 233a provided in housing walls 219, 219a in circumscribing relation with the connection passages 218, 218a.

A force applying piston 234 and a control piston 235 having peripheral seals 236, 237 therein respectively, are slidably received in the upper housing counterbore 217 providing a pair of concertly and relatively movable application members, as discussed in detail hereinafter. The control piston 235 is slidable in the upper housing counterbore 217 between the outlet and control ports 221, 222, and an outlet chamber 238 is defined between said control piston and the housing wall 219 in open pressure fluid communication with said outlet port. An extension 239 is integrally provided on the control piston 235 having a valve seat 240 on the free end thereof for operative engagement with the valve element 225, and a return spring 241 is biased between said control piston and the housing wall 219 to maintain said valve seat in predetermined spaced relation with said valve element. The force applying piston 234 is slidable in the upper housing counterbore 217 between the closure member 213 and the control port 222, and a control chamber 242 is defined in said upper housing counterbore between pistons 234, 235 in open pressure fluid communication with said control port. It should be noted that the return spring 241 normally urges the control piston 235 into abutment with the force applying piston 234 for concerted applied force movement therewith and also urges said force applying piston toward displacement preventing engagement with the closure member 213. A metering spring bore 243 is provided in the piston 234, and a pre-compressed metering spring and force receiving retainer plate assembly 244 is movably contained within said metering spring bore between the lower end thereof and a snap ring and groove assembly 245 provided in said metering spring bore adjacent the upper end thereof, said metering spring and retainer plate assembly being aligned with the closure member opening 214 to receive the force transmitting linkage of the operator control treadle (not shown).

A relay piston 246 having a peripheral seal 247 therein is slidably received in the lower housing counterbore 217a, and an extension 248 is integrally formed on the lower side or face of said relay piston having a valve seat 249 on the free end thereof for operative engagement with the valve element 225a. Another extension or guide 250 having a seal 251 thereon is integrally provided on the upper side or face of the relay piston 246 being slidably received in a bore 252 centrally provided through the intermediate housing, and a return spring 253 is biased between said relay piston and the lower housing wall 219a to normally urge said relay piston toward abutting engagement with said intermediate housing and maintain the extension valve seat 249 in predetermined spaced relation with the valve element 225a. Another outlet chamber 254 is defined in the lower housing counterbore 217a between the lower housing wall 219a and the lower face of the relay piston 246, and an application chamber 255 is also defined in said lower housing counterbore between the upper face of said relay piston and the intermediate housing 210. To complete the description of the control valve 208, connecting passages 256 are provided in the upper and intermediate housings 209, 210 between the outlet chamber 238 and the application chamber 255, and a force transmitting member 257 is provided with opposed reduced portions 258, 259, connected with the control piston extension 239 and the relay piston extension 252, respectively, said member 257 extending coaxially through the valve element opening 230 and normally in abutment between the control and relay pistons 235, 246.

Under normal operating conditions, an operator applied force concertly moves the force applying piston 234 and control piston 235 downwardly to engage the seat 240 with the valve element 225 closing the exhaust opening 230 therein and isolating the outlet chamber 238 from the atmosphere, and thereafter further downward movement of said pistons 234, 235 disengages said valve element from the valve seat 233 to open the connecting passage 218 and establish pressure fluid communication between the inlet and outlet ports 220, 221 wherein pressure fluid flows through the application branch 6, as previously described. The established fluid pressure in the outlet chamber 238 acts on the control piston 235 to create a reaction force in opposition to the applied force and is also transmitted through the housing passages 256 into the application chamber 255 to act on the effective area of the relay piston 246 therein and create an application force. The application force moves the relay piston 246 downwardly to engage the seat 249 with the valve element 225a closing the exhaust opening 230a thereof and isolating the outlet chamber 254 from the atmoshpere, and further downward movement of said relay piston disengages said valve element from the housing valve seat 233a to open the connecting passage 218a and establish pressure fluid communication between the inlet and outlet ports 220a, 221a wherein pressure fluid flows through the application branch 7 substantially simultaneous with the flow through application branch 6, as previously described.

When the desired braking effort is attained, the manually applied force is removed, and the return spring 241 and valve spring 232 return the pistons 234, 235 and valve element 225 toward their original positions to re-engage said valve element with the housing seat 233 interrupting pressure fluid communication between the inlet and outlet ports 220, 221 and disengage the control piston seat 240 from said valve element opening the valve element exhaust passage 230 and exhausting the application branch 6 to atmosphere, as previously described. When the outlet chamber 238 is so vented to atmosphere, the fluid pressure in the application chamber 255 is also vented to atmosphere eliminating the application force. Upon elimination of the application force, the return spring 253 and valve spring 232a return the relay piston 246 and valve element 225a toward their original positions to reengage said valve element with the housing valve seat 233a interrupting pressure fluid communication between the inlet and outlet ports 220a, 221a and disengage the relay piston seat 249 from said valve element opening the exhaust passage 230a thereof and exhausting the application branch 7 to atmosphere, as previously described.

In the event fluid pressure is reduced or lost in one of the reservoirs 11, 17 of the application branches 6, 7 to create an emergency condition, the control valve 208 functions in substantially the same manner to effect pressure fluid flow through the application branch having the charged reservoir. In the event fluid pressure is lost from the application branch 6, the force transmitting member 257 transmits the manually applied force from the pistons 234, 235 directly to the relay piston 246 to effect movement thereof for actuating the valve element 225a and establishing flow through the application branch 7. In the event fluid pressure is lost from the application branch 7, the pistons 234, 235 are movable in response to the applied force to actuate the valve element 225 and establish flow through the branch 6 which acts on the relay piston 246 in the application chamber 255 to move said relay piston downwardly into engagement with the housing wall 219a since fluid pressure in the application branch 7 was assumed to be lost.

In the event the operator treadle or treadle linkage is lost, broken or disengaged from the control valve 208, or for some other reason becomes inoperative to prevent the transmission of the operator applied force to the force applying piston 234, the operator can manually move the push-pull valve 27 to the emergency or charging position thereof to interrupt pressure fluid communication between the control chamber 242 of the control valve 208 and the atmosphere and establish pressure fluid communication between the protected control branch reservoir 25 and the control chamber 242 through the conduit 24. When the control branch 9 of the system 1 is manually actuated in this manner, the fluid pressure in the control chamber 242 acts on the effective area of the force applying piston 234 to urge it against the closure member 213, and the fluid pressure in said control chamber also acts on the effective area of the control piston 235 therein to move said control piston downwardly relative to said force applying piston. This relative movement of the control piston 235 serves to actuate the valve element 225 and establish pressure fluid flow through the application branch 6, and the established fluid pressure in the application branch 6 serves to move the relay piston 246 to actuate the valve element 225a and establish pressure fluid flow through the application branch 7, as previously described.

From the foregoing, it is now apparent that a novel control valve meeting the objects and advantages set out hereinbefore is provided and that changes or modifications to the precise configurations, shapes or details of the constructions set forth in the disclosure may be made by those skilled in the art by way of illustration without departing from the spirit of the invention as defined by the claims which follow.

The embodiments of the invention in which an exclusive property or privilege is claimed are defined as follows:

1. A control valve comprising a housing having inlet and outlet ports therein, valve means controlling pressure fluid communication between said inlet and outlet ports, a pair of control members concertedly and relatively movable in said housing, a force responsive portion including metering spring means contained within one of said control members for receiving an actuating force, a driving portion on said one control member for driving engagement with the other of said control members, an expansible fluid pressure chamber in said housing between said control members for selective subjection to fluid pressure and the atmosphere, and operator controlled means for applying the actuating force on said force responsive portion, said pair of control members being normally concertedly movable in response to the actuating force applied on said force receiving portion by said operator controlled means when said chamber is subjected to the atmosphere to engage said other control member with said valve means and move said valve means to a position establishing pressure fluid communication between said inlet and outlet ports, said metering spring means providing movement of said pair of control members relative to said operator controlled means and against the actuating force in response to the established fluid pressure at said outlet port acting on the effective area of said other control member, and said other control member also being movable relative to said one control member in response to fluid pressure in said chamber when said chamber is subjected to fluid pressure to actuate said valve means in the event said operator controlled means is inoperable to actuate said one control member.

2. The control valve according to claim 1 comprising other inlet and outlet ports in said housing, other valve means controlling pressure fluid communication between said other inlet and outlet ports, a third control member movable in said housing for operative engagement with said other valve means, and abutment means between said other and third control members and providing concerted movement thereof to engage said third control member with said other valve means and move said other valve means to a position establishing pressure fluid communication between said other inlet and outlet ports upon the relative movement of said other control member in response to fluid pressure in said chamber.

3. The control valve according to claim 1, comprising a control port in said housing connected with said chamber, and means including selectively operable means connected with said control port, said selectively operable means being movable between one position subjecting said control port to the atmosphere and another position subjecting said control port to fluid pressure.

4. A control valve comprising a housing having a pressure fluid flow passage therethrough, application means movable in said housing and controlling said flow passage including a pair of concertedly and relatively movable members, a force receiving portion including resilient metering means contained within one of said members for receiving an actuating force, a driving portion on said one member for driving engagement with the other of said members, an expansible fluid pressure chamber in said housing between said pair of members for selective subjection to fluid pressure and the atmosphere, and operator controlled means for applying the actuating force on said force responsive portion, said operator controlled means normally being operable to apply the actuating force on said force receiving portion to move said one member and concertedly drive said other member therewith toward an actuated position in said flow passage establishing pressure fluid flow therethrough when said chamber is subjected to the atmosphere, said resilient metering means providing concerted movement of said pair of members relative to said operator controlled means and against the actuating force in response to established fluid pressure in said flow passage acting on the effective area of said other control member therein, and said other member also being movable relative to said one member toward its actuated position in response to fluid pressure in said chamber upon the subjection thereof to fluid pressure in the event said operator controlled means is inoperable to actuate said one member.

5. The control valve according to claim 4, comprising selectively operable means connected with said chamber, said selectively operable means being movable between one position subjecting said chamber to the atmosphere and another position subjecting said chamber to fluid pressure.

6. The control valve according to claim 4, comprising another pressure fluid flow passage through said housing, other application means movable in said housing and controlling pressure fluid flow through said other flow passage, and abutment means between said other member and other application means providing concerted movement of said other application means with said other member toward an actuated position in said other flow passage establishing pressure fluid flow therethrough upon movement of said other member in response to fluid pressure in said chamber.

References Cited by the Examiner
UNITED STATES PATENTS

| | | | |
|---|---|---|---|
| 3,152,844 | 10/1964 | Bueler | 303—52 |
| 3,219,396 | 11/1965 | Bueler | 303—52 |
| 3,227,494 | 1/1966 | Alfieri | 303—13 X |

EUGENE G. BOTZ, *Primary Examiner.*